US008671359B2

(12) United States Patent
Koizumi et al.

(10) Patent No.: US 8,671,359 B2
(45) Date of Patent: Mar. 11, 2014

(54) SCROLL DISPLAY CONTROL (75) Inventors: Hirokazu Koizumi, Tokyo (JP); Naohiro Takeda, Tokyo (JP); Makoto Iwata, Tokyo (JP); Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 227 days.

(21) Appl. No.: 10/548,082

(22) PCT Filed: Mar. 5, 2004

(86) PCT No.: PCT/JP2004/002799
§ 371 (c)(1),
(2), (4) Date: May 3, 2006

(87) PCT Pub. No.: WO2004/079709
PCT Pub. Date: Sep. 16, 2004

(65) Prior Publication Data
US 2006/0242595 A1   Oct. 26, 2006

(30) Foreign Application Priority Data

Mar. 7, 2003   (JP) .................................. 2003-60774

(51) Int. Cl.
*G06F 3/00*   (2006.01)
(52) U.S. Cl.
USPC ........... 715/786; 715/787; 715/719; 715/721; 715/722; 345/684; 345/213
(58) Field of Classification Search
USPC .................................. 715/786, 787, 719, 721
See application file for complete search history.

(56) References Cited

U.S. PATENT DOCUMENTS

| 4,924,432 | A | * | 5/1990 | Asai et al. ..................... 345/540 |
| 5,613,909 | A |   | 3/1997 | Stelovsky |
| 5,832,171 | A | * | 11/1998 | Heist ............................ 386/241 |
| 5,929,927 | A | * | 7/1999 | Rumreich et al. ............ 348/563 |
| 5,936,618 | A | * | 8/1999 | Spiero et al. .................. 345/204 |
| 6,098,085 | A | * | 8/2000 | Blonder et al. ............... 715/208 |
| 6,714,909 | B1 | * | 3/2004 | Gibbon et al. ................ 704/246 |
| 6,778,756 | B1 | * | 8/2004 | Fujimura et al. ............. 386/239 |
| 6,931,587 | B1 | * | 8/2005 | Krause .......................... 715/205 |
| 7,827,297 | B2 | * | 11/2010 | Kristjansson ................. 709/231 |

(Continued)

FOREIGN PATENT DOCUMENTS

JP    9-106292 A    4/1997
JP    2000-99526 A    4/2000

(Continued)

*Primary Examiner* — Daeho Song
(74) *Attorney, Agent, or Firm* — Sughrue Mion, PLLC (57) ABSTRACT A scroll display control device is provided, which is capable of scroll-displaying a text corresponding to a picture in such manner that the text can be easily understood. The scroll display control device scroll-displays, in synchronism with reproduction of the picture correlated to text information (TI), the corresponding text information (TI) on a text display screen (TW). A scroll speed calculation unit (102) dynamically calculates a text scroll speed (v) on the basis of a time length of a picture section presently under reproduction, a text quantity of the corresponding text section and text display setting information. A picture text control unit (104) scroll-displays text of the text section at a predetermined reference position of the text display screen (TW) according to the scroll speed (v). By displaying preceding and succeeding texts with respect to the text corresponding to the picture section presently under reproduction, it is possible to read back and pre-read.

31 Claims, 8 Drawing Sheets

(56) References Cited

U.S. PATENT DOCUMENTS

| | | | |
|---|---|---|---|
| 2002/0109710 A1* | 8/2002 | Holtz et al. | 345/723 |
| 2003/0090507 A1* | 5/2003 | Randall et al. | 345/731 |
| 2003/0143944 A1* | 7/2003 | Martin et al. | 455/3.01 |
| 2004/0078188 A1* | 4/2004 | Gibbon et al. | 704/1 |
| 2004/0143673 A1* | 7/2004 | Kristjansson | 709/231 |
| 2004/0201610 A1* | 10/2004 | Rosen et al. | 345/731 |
| 2004/0205087 A1* | 10/2004 | Dorsey et al. | 707/104.1 |
| 2004/0260569 A1* | 12/2004 | Bell et al. | 705/1 |
| 2005/0053359 A1* | 3/2005 | Jung et al. | 386/95 |
| 2007/0204319 A1* | 8/2007 | Ahmad et al. | 725/134 |
| 2007/0204619 A1* | 9/2007 | Pelz et al. | 60/605.2 |

FOREIGN PATENT DOCUMENTS

| | | |
|---|---|---|
| JP | 2001-209361 A | 8/2001 |
| JP | 2001-296852 A | 10/2001 |
| JP | 2002-278974 A | 9/2002 |
| WO | WO 97/41504 A | 11/1997 |

* cited by examiner

SCROLL DISPLAY CONTROL

TECHNICAL FIELD

The present invention relates to a system for displaying text corresponding to series information such as pictures and sound, and in particular, a device and a method for performing the scroll display of the text in synchronism with the series information,

BACKGROUND ART

Various kinds of devices for synchronously displaying a picture and a text have been proposed. For example, Japanese Unexamined Patent Publication No. 2001-209361 (hereinafter, referred to as "Patent Document 1") discloses a multi-media display device capable of displaying the text in synchronism with the reproduced pictures to indicate a specific position on the text related to the picture. More specifically, the multi-media display device preliminarily sets the scenario indicative of the correspondence of a reproduction section of picture data to a text page to be displayed in the reproduction section. Subsequently, when a cursor is located in a text display area in one dynamic picture screen, the multi-media display device displays the cursor at the same position on the corresponding text screen. This configuration facilitates the understanding of viewers.

However, in the multi-media display device described in the Patent Document 1, when the page corresponding to the picture is changed, the next page appears, and the text in the previous page cannot be read back before a user checks contents of the picture.

Further, Japanese Unexamined Patent Publication No. 2001-296852 (hereinafter, referred to as "Patent Document 2") discloses a method for scroll-displaying text information in synchronism with display of the picture. In this method, the text is scroll-displayed corresponding to the change of the picture by utilizing the specification to realize the multi-media presentation and the scroll function of the browser on the WEB. The scroll speed is preliminarily defined in the text file.

However, in the scroll display control method described in Patent Document 2, the scroll speed is a predetermined speed defined by the text file, and in some cases, the picture and the text cannot be synchronously displayed. For example, it is assumed that a slow speaker is changed to a fast speaker. In this case, speech quantity corresponding to the picture per unit time (the quantity of the text) is changed, and perfect synchronization of the picture with the text cannot be obtained at the predetermined scroll speed.

Regarding the scroll speed of the text, Japanese Unexamined Patent Publication No. 2000-99526 (hereinafter, referred to as "Patent Document 3") discloses a document information extraction device capable of changing the scroll speed according to the degree of importance of document information.

In the document information extraction device described in Patent Document 3, the scroll speed is changed according to the degree of importance of the document information irrespective of quantity of the text. Thus, the text is not always easily read by a user. Further, the degree of importance of the document may be different for each user.

As described above, in a conventional display technology of the text corresponding with picture, the text display which is synchronous with the picture, and easy to read and understand cannot be obtained.

It is an object of the present invention to provide a scroll display control device and a scroll display control method which are capable of performing the scroll display to easily understand the text corresponding to series information.

It is another object of the present invention to provide a scroll display control device and a scroll display control method which are capable of maintaining perfect synchronization of series information with the text even when quantity of the text corresponding to series information is changed.

It is still another object of the present invention to provide a scroll display control device which is capable of easily changing the display setting according to the desire of the user and of displaying the text flexibly corresponding to the change of the display setting.

DISCLOSURE OF INVENTION

According to the first aspect of the present invention, a display control device, which scroll-displays, in synchronism with reproduction of series information correlated to text information, the corresponding text information on a text display screen, changes a scroll speed on the text display screen on the basis of a text quantity of corresponding the text information with respect to a reproduction time of the series information.

According to a second aspect of the present invention, a series information-ready text display control device, which scroll-displays, in synchronism with reproduction of series information correlated to text information, the corresponding text information on a text display screen, comprises scroll speed calculation means for calculating a scroll speed of the text on the basis of at least a time length of a series information section presently during reproduction and quantity of the text belonging to a text section corresponding to the series information section under reproduction, and control means for scroll-displaying the text belonging to the text section at a predetermined reference position of the text display screen according to the scroll speed.

According to the present invention, the scroll speed of the text can be dynamically changed corresponding to the series information under reproduction, and the text section corresponding to the series information under reproduction can be scroll-displayed at a predetermined reference position of the text display screen.

In addition, if the text section corresponding to the series information during reproduction and preceding and succeeding text sections are displayed, a preceding text can be checked, and a succeeding text can be pre-read. Further, by changing the predetermined reference position of the text display screen, the text can be displayed with priority placed on the checking of the preceding text, and the text can be displayed with priority placed on the pre-reading of the succeeding text.

Further, the display setting of the text can also be dynamically changed. Thus, the setting can be changed to the display to be easily watched according to the scroll speed.

BEST MODE FOR CARRYING OUT THE INVENTION

The present invention will be described in detail with reference to the attached drawings. Firstly, a display screen to be displayed by the picture-ready text display control device of the present invention, picture information, text information, and picture text corresponding information used therein will be described below.

Display Screen

Figure 1:
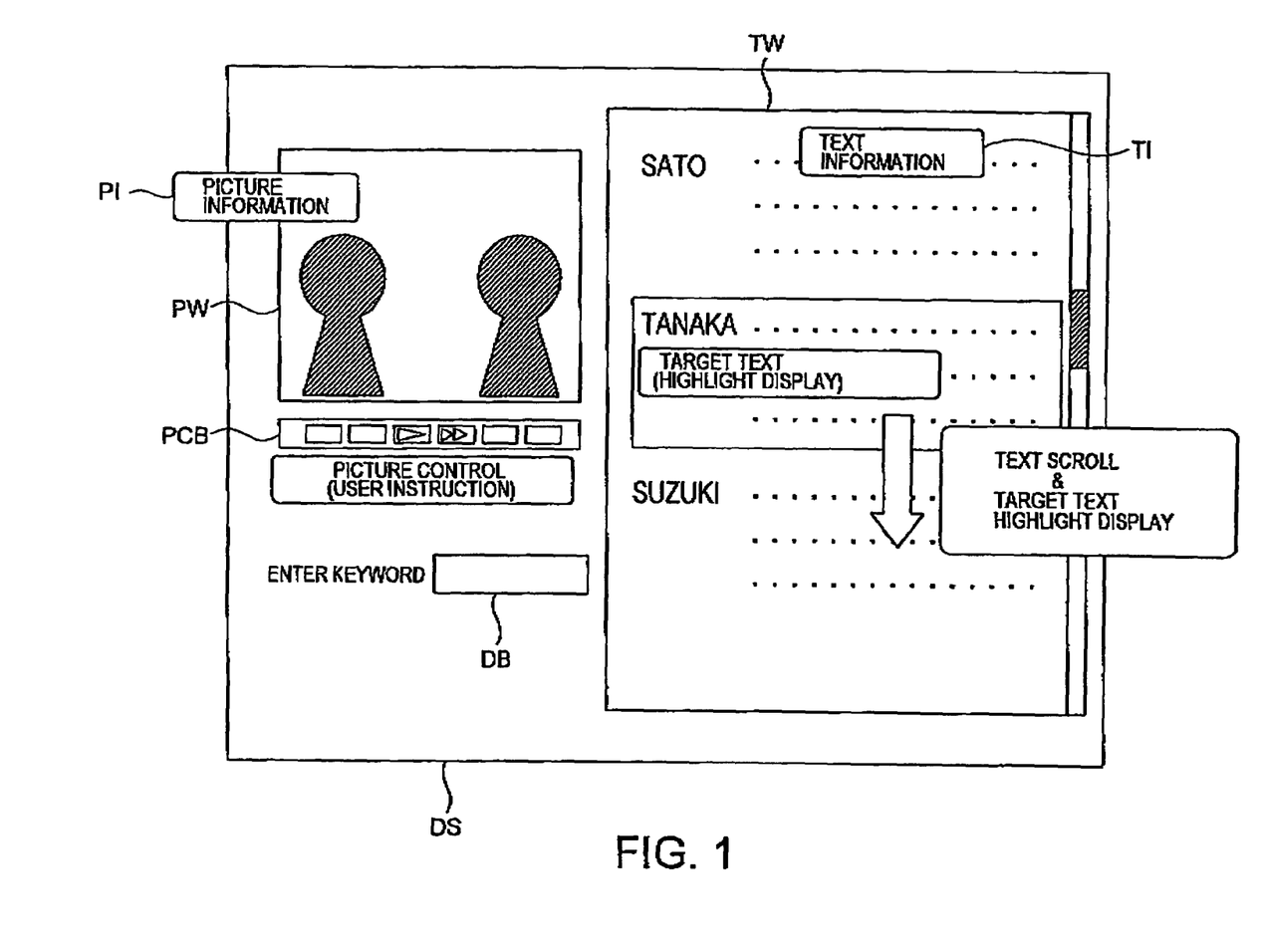
FIG. 1 is a schematic diagram showing an example of a display screen to be displayed by a picture-ready text display control device according to the present invention.

FIG. 1 is a schematic diagram showing an example of a display screen DS to be displayed by a picture-ready text display control device according to the present invention. In this example, picture information PI and text information TI are displayed on one screen DS. A picture control button PCB is displayed below a picture information display window PW, and the user instruction such as standard reproduction, fast-forward, and rewind can be inputted by clicking the picture control button by a mouse or the like by the user. In addition, a dialog box DB for the keyword input is displayed, and a keyword related to the picture desired by the user can be inputted. As described below, by inputting the keyword by the user, the picture retrieved by the keyword and text information TI corresponding thereto can be called.

The text information display window TW is displayed on the display screen DS together with the picture information display window PW. The text information display window TW is also referred to as a text display screen. Text information TI corresponding to the picture under reproduction is scroll-displayed on the text information display window TW in synchronism with the progress of the pictures. Following this example, it is assumed that a picture presented by speaker named Tanaka™ is displayed. In this situation, text information TI of the speech of "Tanaka" is scroll-displayed on the text information window TW together with the preceding and succeeding speeches, As described below, the scroll speed is controlled to be higher if the speech amount (the text amount) to the speech time of "Tanaka" increases, and to be lower if the speech amount decreases. In this situation, a speech text of "Tanaka" may be highlight-displayed in a center of the text information display window TW as a target text.

The text information TI may be text in which information corresponding to the picture is described. The text information TI includes not only dialogs of and speech records of the speaker in the picture but also the text and presentation materials describing the content of the picture.

Picture Text Corresponding Information

Figure 2:
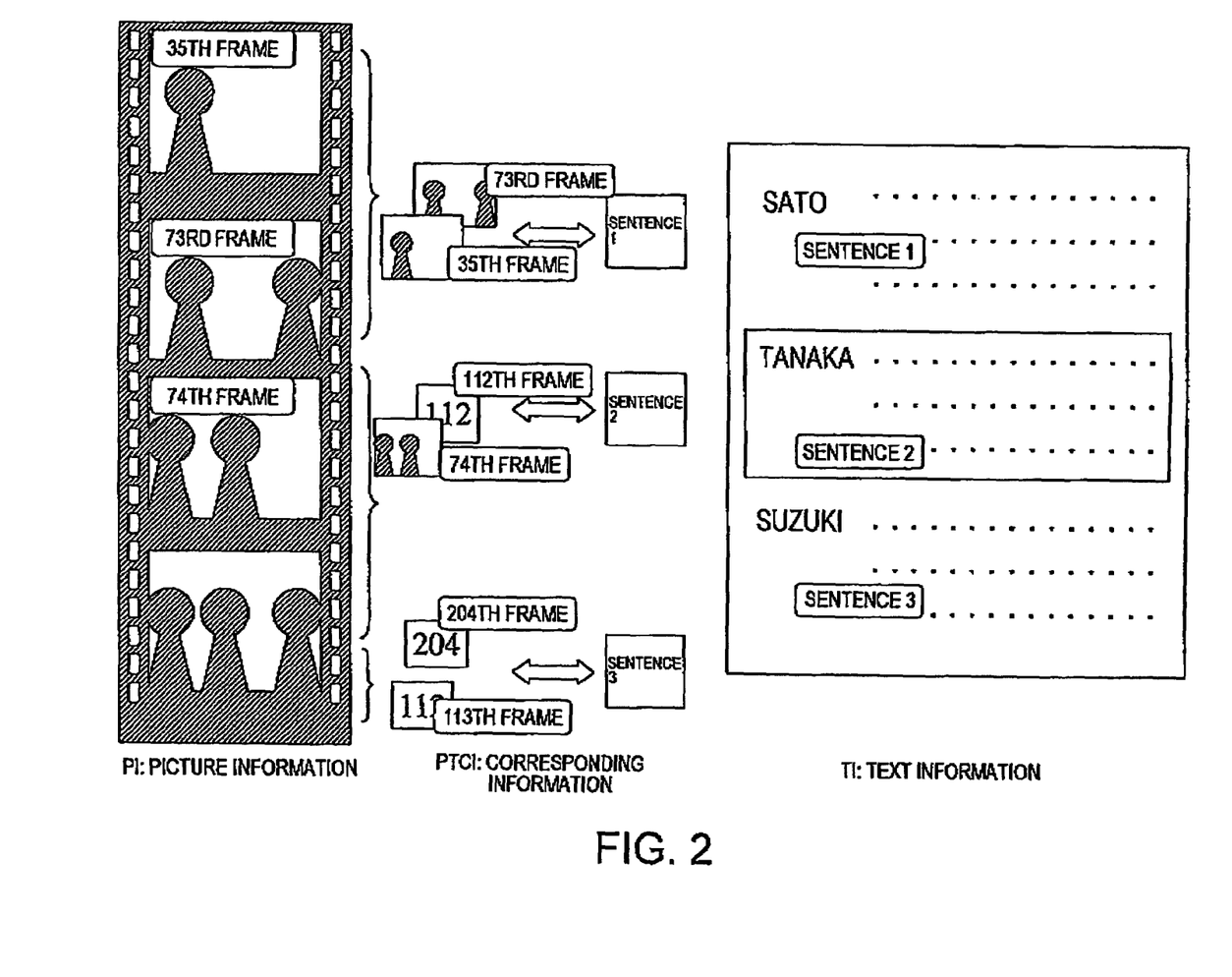
FIG. 2 is a schematic diagram showing an example of picture text corresponding information indicative of the corresponding relationship between picture information and text information.

The above-mentioned synchronous display of the picture and the text can be realized by correlating the picture information PI to the text information TI. Picture text corresponding information PTCI is information indicative of the corresponding relationship of a certain section in the picture (a picture section) and a certain section in the text (a text section). For example, the text information TI is preliminarily divided into a plurality of text sections by the speaker or the punctuation of the speech and sentences, and these text sections and the starting time and the ending time (or the frame number) of the corresponding picture section are correlated to each other as picture text corresponding information. FIG. 2 shows a specific example of the picture text corresponding information PTCI.

FIG. 2 is a schematic diagram showing an example of the picture text corresponding information PTCI indicative of the corresponding relationship between the picture information PI and the text information TI. In this example, it is assumed that the picture section from Frame 35 to Frame 73 of a certain picture information is the speech part of "Sato", the picture section from Frame 74 to Frame 112 is the speech part of "Tanaka", and the picture section from Frame 113 to Frame 204 is the speech part of "Suzuki" and it is assumed that the speech text of "Sato" is Sentence 1, the speech text of "Tanaka" is Sentence 2, and the speech text of "Suzuki" is Sentence 3, respectively.

In FIG. 2, the picture text corresponding information PTCI is a table which correlates the picture section of Frame 35 to Frame 73, the picture section of Frame 74 to Frame 112, and the picture section of Frame 113 to Frame 204 to the text section of Sentence 1, the text section of Sentence 2, and the text section of Sentence 3, respectively.

By referring such picture text corresponding information PTCI, the display shown in, for example, FIG. 1 becomes possible. In other words, when Frame 74 to Frame 112 of the picture information PI are reproduced and displayed, the Sentence 2 of "Tanaka" as the target text can be highlight displayed in the center part of the text information display window TW. Under the circumstances, Sentence 1 of "Sato" which was spoken previously is arranged above Sentence 2 of "Tanaka" which is presently spoken, and Sentence 3 of "Suzuki" which will be spoken next will be arranged below Sentence 2, respectively, and the sentences are successively scroll-displayed in synchronism with the progress of the picture.

First Embodiment

Figure 3:
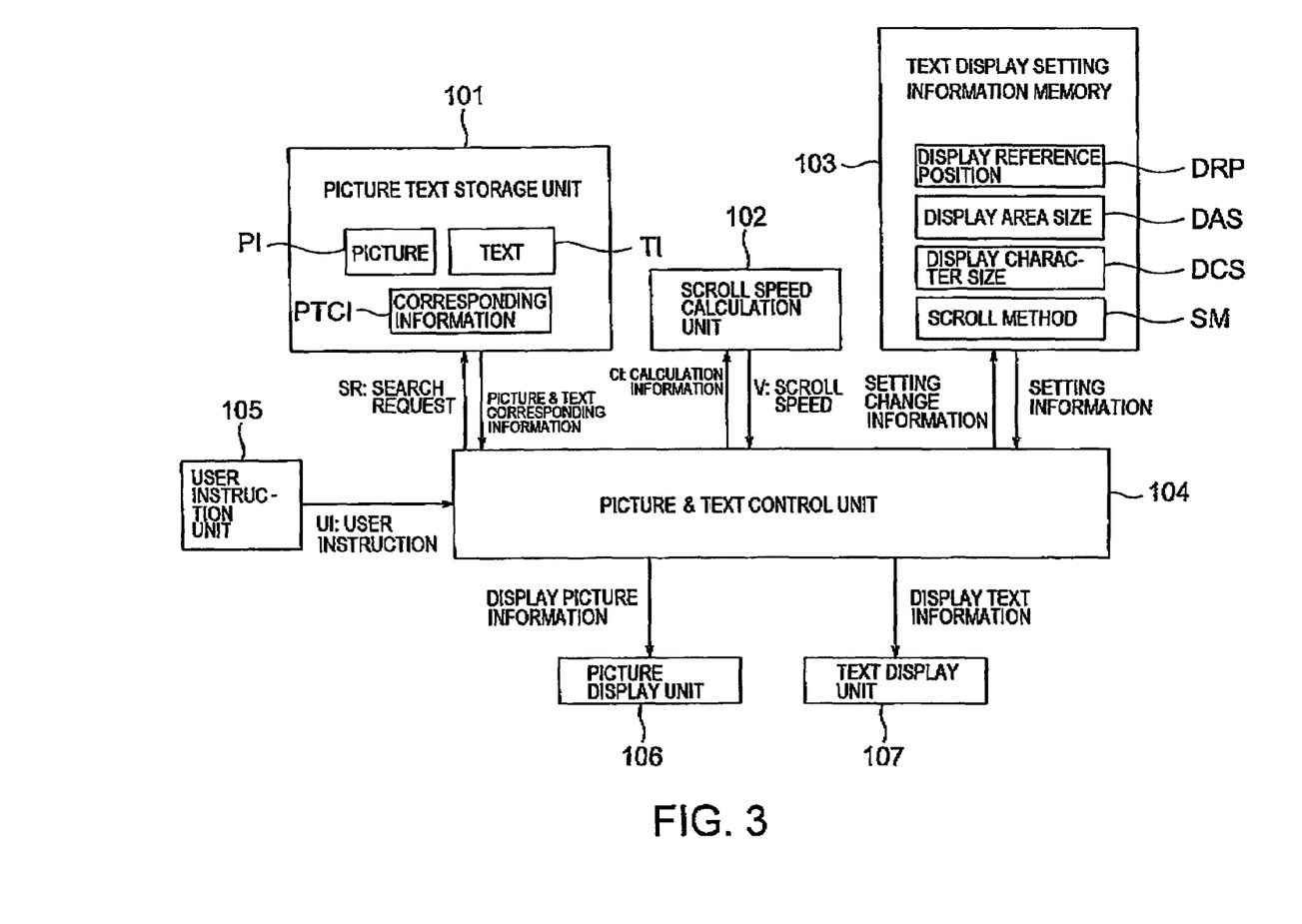
FIG. 3 is a block diagram showing a configuration of a picture-ready text display control device according to a first embodiment of the present invention.

FIG. 3 is a block diagram showing the configuration of the picture-ready text display control device according to a first embodiment of the present invention. The picture-ready text display control device of the present invention comprises a picture text storage unit 101, a scroll speed calculation unit 102, a text display setting information memory 103, and a picture text control unit 104.

The picture text storage unit 101 stores the picture information PI, the text information TI, and the picture text corresponding information PTCI illustrated in FIG. 2 in a retrievable manner to produce the picture information PI, the text information TI and the corresponding information PTCI thereof which meet the designated retrieval condition.

The scroll speed calculation unit 102 calculates the scroll speed of the text display by inputting calculation information from the picture text control unit 104 in the manner which will later be described. The scroll in the present embodiment includes not only the operation to sequentially move the display, but also the operation to move the display at a predetermined time interval, and the operation to start the movement of the display after a predetermined time.

The text display setting information memory 103 holds text display setting information for describing parameters forming the reference when displaying the text. More specifically, the text display setting information includes a display reference position DRP of the target text (the text corresponding to the image which is presently under reproduction), a text display area size DAS indicative of the height H and the width W of the text display area, a display character size DCS indicative of the height h and the width w of the character, a scroll method SM indicative of the scrolling method, or the like.

The picture-ready text display control device further includes a user instruction unit 105 which receives the input of various kinds of user instructions UI. More specifically, the user instruction unit 105 is an input device such as a keyboard and a pointing device. The input method of the user instruction UI includes, as illustrated in FIG. 1, a method for selection from a menu indicated by buttons, characters, icons or the like by the user, a method by the character input using the keyboard or the like, and a programming method so as to generate the user instruction prompt according to the picture reproduction position.

The user instruction UI is information to operate the pictures and the text, and specifically includes the following instructions.

A display instruction: instruction to still-display one frame of picture
A reproduction instruction: instruction to reproduce picture at regular speed
A stop instruction; instruction to stop picture
An n-time fast-forward instruction: instruction to fast-forward picture at two-time speed, three-time speed or the like
An n-time rewind instruction: instruction to rewind picture at two-time speed, three-time speed or the like
A 1/n time slow reproduction instruction: instruction to slow-reproduce picture at 1/n time speed
A text display area size changing instruction: instruction to change the size of text display area
A display character size changing instruction: instruction to change the size of characters of the display text
A display position changing instruction: instruction to change display position of the target text section corresponding to the picture section presently under reproduction (hereinafter, referred to as the target picture section)
A scroll method changing instruction: instruction to change a method for scrolling the text
A target text changing instruction: instruction to change the target text changing instruction or the target picture section
A text retrieval instruction: instruction to retrieve the text, and to obtain the position in the text section or text information including the keyword The picture text control unit 104 synchronizes the picture information PI with the text information TI in the manner which will later be described, and displays the dynamic picture and text information TI on a picture display unit 106 and a text display unit 107, respectively. The picture display unit 106 and the text display unit 107 may be monitors separate from each other, or, as illustrated in FIG. 1, may display the picture and the text parallel to each other by dividing one monitor screen.

Figure 4:
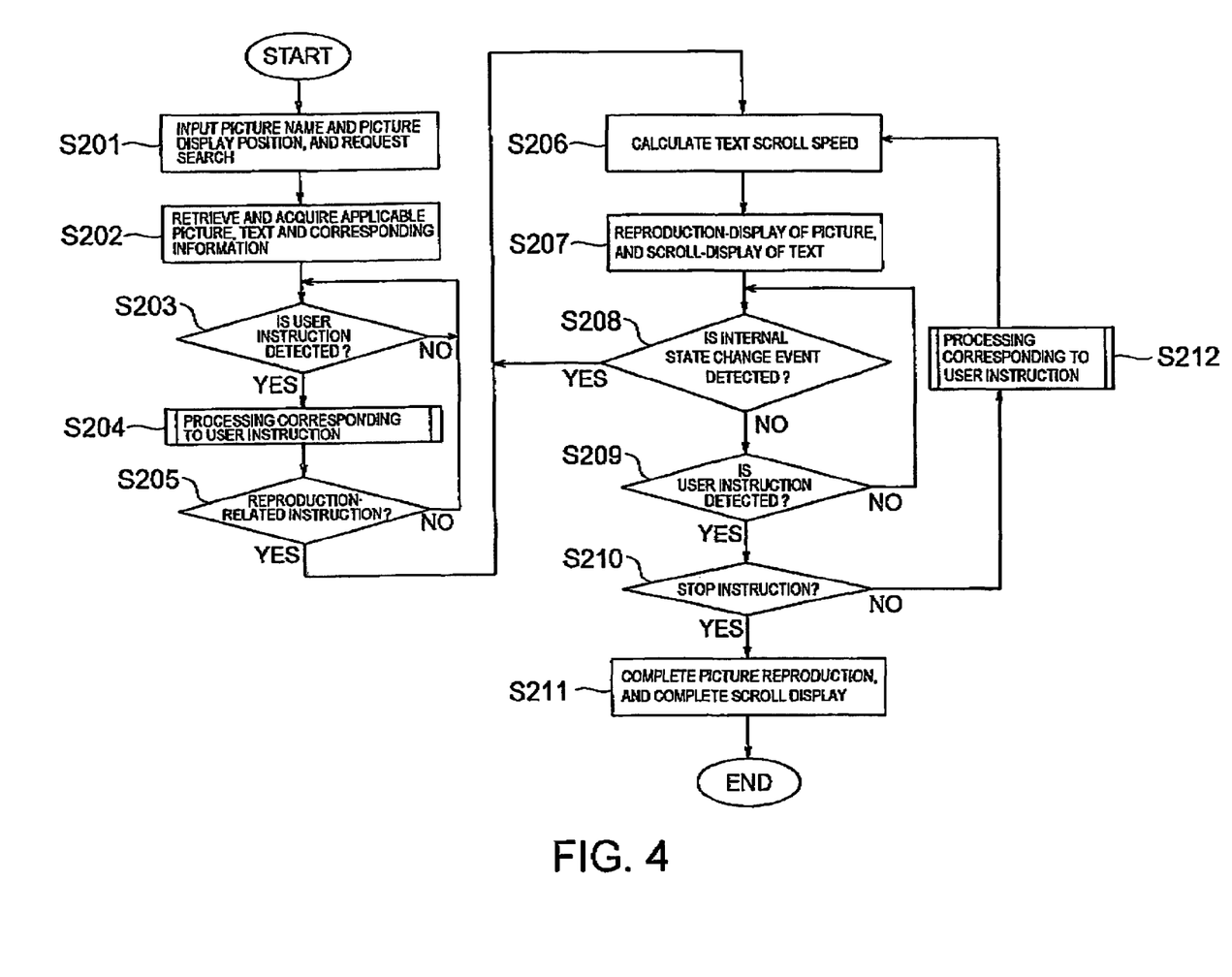
FIG. 4 is a flowchart showing picture text control operation of the picture-ready text display control device according to the first embodiment.

FIG. 4 is a flowchart showing the picture text control operation of the picture-ready text display control device according to the present embodiment. Firstly, the user enters the desired picture name, picture display position information or the keyword related to the desired picture through the user instruction unit 105.

When the desired picture name and the picture display position information are inputted, the picture text control unit 104 performs the retrieval request (search request) SR of the picture data to the picture text storage unit 101 with the input picture name and picture display position information as the key (Step 201).

When the keyword is input, the picture text control unit 104 retrieves the picture text storage unit 101 in accordance with the inputted keyword, and when text information including the keyword is obtained, the search request SR of the picture data is performed by using the picture name and picture display position information corresponding thereto.

The picture text control unit 104 acquires from the picture text storage unit 101 the applicable picture data (information) PI, the text information TI and the corresponding information PTCI thereof (Step S202). In this condition, the picture text control unit 104 may display the still frame of the picture corresponding to the picture display position information. At the same time, the picture text control unit 104 may display the display text on the text display section 107 on the basis of the picture text corresponding information PTCI, the text information TI and text display setting information stored in the memory 103. Further, a method of preparing a display text will be described below.

In this condition, the picture text control unit 104 waits for occurrence of the user instruction UI (Step S203). When the user instruction UI occurs, the picture text control unit 104 performs the processing corresponding thereto (which will be described below) (Step S204), and determines whether or not the user instruction UI is the reproduction related instruction RRI (Step S205). The reproduction related instruction RRI includes, for example, the reproduction instruction, the N-time reproduction instruction, the 1/N time slow reproduction instruction, and the N-time rewind instruction. If the user instruction UI is not the reproduction related instruction RRI, the program returns to Step S203. If the user instruction UI is the reproduction related instruction RRI (YES in Step S205), the picture text control unit 104 executes the following processing.

Firstly, the picture text control unit 104 outputs scroll speed calculation information CI required to calculate the speed for scrolling the text to the scroll speed calculation unit 102, and receives the calculated scroll speed v (Step S206). The scroll speed calculation information CI includes the length of the picture section presently under reproduction, the number of characters of the text corresponding to the picture section presently under reproduction, and text display setting information. The method for calculating the scroll speed v will be described below.

Subsequently, the picture text control unit 104 prepares a new display text on the basis of text control information including the picture reproduction position, the picture text corresponding information PTCI, the calculated scroll speed v and the text display setting information, and the text information TI, performs the scroll display of the text information TI in question at the calculated scroll speed v, and performs the picture reproduction display (Step S207).

So long as any internal state change event or any new user instruction UI occurs (NO in Step S208 and NO in Step S209), the picture text control unit 104 repeats the text scroll display and the picture reproduction display (Step S207) on the basis of the picture reproduction position at the time. Further, the internal state change event is an event occurring in the picture text control unit 104, and occurs when the picture reproduction position reaches the ending time of the target text section.

If the internal state change event is detected (YES in Step S208), and shifted to the next text section, the program returns to the scroll speed calculation Step S206. However, if there is a difference between the ending time of the present text section and the starting time of the next text section, it is regarded that the blank text section is present, and the scroll speed may be calculated. In other words, it is regarded to perform the scroll display with the scroll speed being zero, and the scroll display is distinguished from the stop instruction described below.

If the user instruction UI is detected (YES in Step S209), the picture text control unit 104 determines whether or not the user instruction is the stop instruction SI (Step S210). If the user instruction UI is not the stop instruction SI (NO in Step S210), the processing corresponding to the user instruction UI is executed (Step S212), the program returns to the scroll speed calculation Step S206.

If the stop instruction SI is detected (YES in Step S210), the picture text control unit 104 stops the picture reproduction display and the scroll display of the text (Step S211). The stop instruction SI occurs not only in a case in which the stop instruction is inputted from the user instruction unit 105, but also in a case in which the picture reproduction position reaches the ending time of the picture, or in a case in which the picture reproduction position reaches the ending time of the text section at the tail end.

As described above, if any user instruction other than the stop instruction SI is detected, the picture text control unit 104 executes the processing for each user instruction UI, and sends the scroll calculation information to the scroll calculation unit 102 to re-calculate the scroll speed v (Step S206). In addition, the picture text control unit 104 updates text display setting information as necessary, newly prepares text control information TCI, and repeats the picture reproduction display and the scroll display by using the text control information TCI and the text information TI.

Next, the processing of the user instruction in Step S204 and Step S212 will be described.

Figure 5:
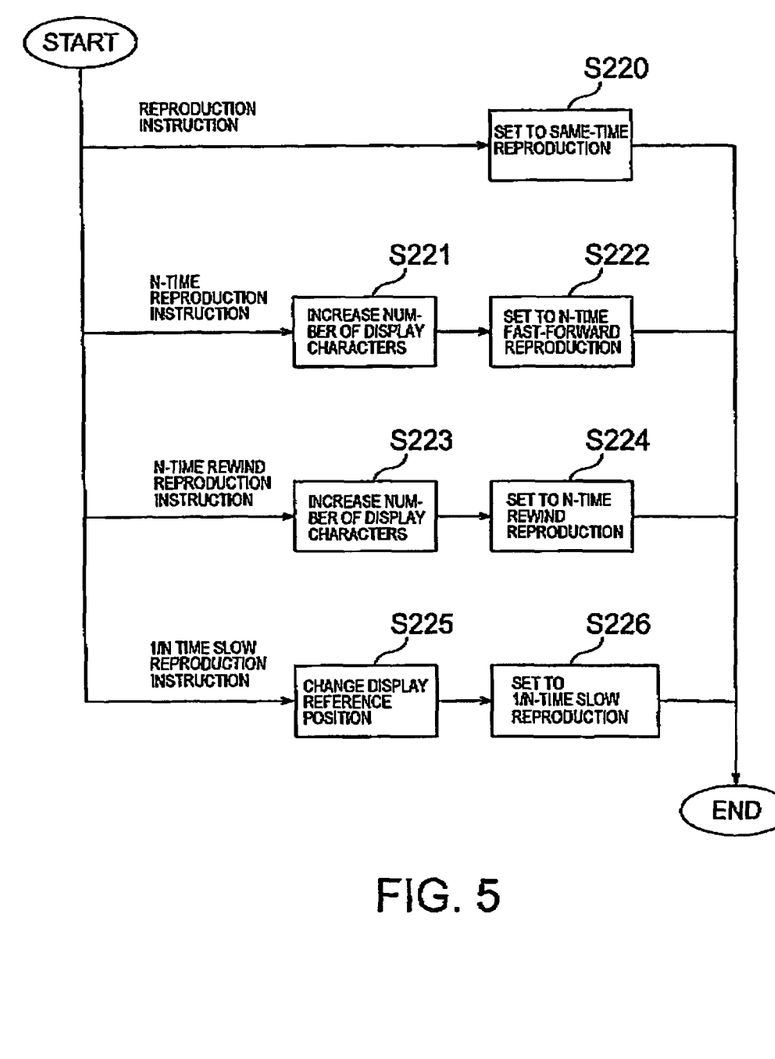
FIG. 5 is a flowchart showing the processing if a user instruction is given.
Figure 6:
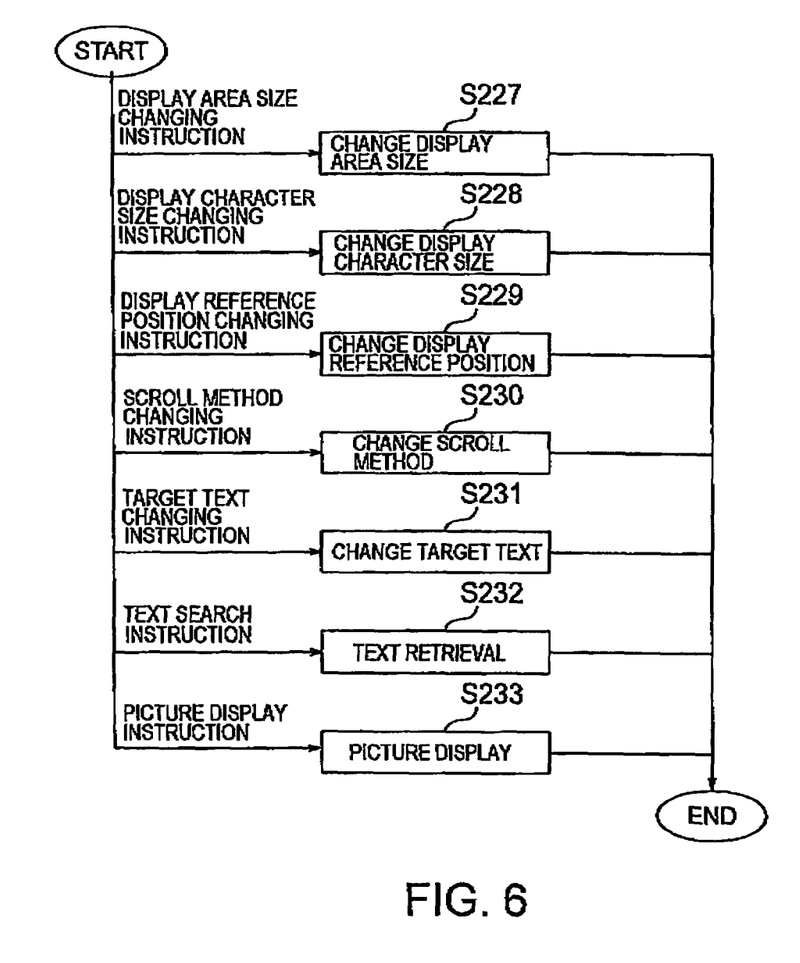
FIG. 6 is a flowchart showing the processing if a user instruction is given.

FIGS. 5 and 6 are flowcharts showing the processing when each user instruction is present.

(Picture Reproduction Instruction)

When the reproduction instruction is given from the user instruction unit 105, the picture text control unit 104 sets the reproduction state of the picture in the picture display section 106 to the same-time reproduction (Step S220).

(N-Time Reproduction)

When the N-time fast-forward reproduction instruction is inputted from the user instruction unit 105, the picture text control unit 104 performs the processing of increasing the number of characters to be displayed in the screen (Step S221), and sets the reproduction state of the picture in the picture display section 106 to the N-time fast-forward reproduction (Step S222).

The processing of increasing the number of characters includes, for example, processing of the character size changing instruction of decreasing the size of the characters included in text display setting information, processing of the display size changing instruction of increasing the size of the display text area, or the processing of combination of both instructions (which will be described below). In addition, an option that the display setting is not changed is also available. These processing can be preliminarily specified for each system, or set in detail on the basis of the characteristic of the picture, the taste of the user, or the like. Therefore, the time of displaying the text is prolonged, and a situation that the text is not displayed before the text is read by the high scroll speed can be effectively avoided.

In addition, if there is a section that any text is not present between the target text section and the preceding or succeeding text section, the section may be determined as the target text section including the section. Thus, the time corresponding to the picture section presently in reproduction becomes longer than the actual time, and any situation that text is not displayed before the text is read by the slow scroll speed can be effectively avoided.

(N-Time Rewind Reproduction)

When the N-time rewind reproduction instruction is inputted from the user instruction unit 105, the picture text control unit 104 performs the processing of increasing the number of characters to be displayed in the screen similar to the case of N-time fast-forward (Step S223), and the reproduction state of the picture in the picture display unit 106 is set to be N-time rewind reproduction (Step S224).

(1/N-Time Slow Reproduction)

When the 1/N-time slow reproduction instruction is inputted from the user instruction unit 105, the picture text control unit 104 performs processing of the display position changing user instruction to change the display reference position of the text display setting information to display many texts belonging to the succeeding text section (Step S225), and sets the reproduction state of the picture on the picture display unit 106 to the 1/N-time slow reproduction (Step S226).

As described above, by displaying many text sections at the succeeding position corresponding to the picture reproduction position during the 1/N-time slow reproduction, frustration caused by the past read text for a long time can be eliminated, and a desire of reading the succeeding text can be met.

(Text Display Area Size Changing Instruction)

When the text display area size changing instruction is detected, the picture text control unit 104 changes the text display area size of text display setting information on the basis of information (the height H and the width W) indicative of the size of the text display area (Step S227). Thus, the size of the text display area can be changed so as to easily watch the text display area.

(Display Character Size Changing Instruction)

When the display character size changing instruction is detected, the picture text control unit 104 changes the display character size of text display setting information on the basis of information (the height h and the width w) indicative of the size of characters to be displayed (Step S228). Thus, the size of the characters to be displayed can be changed to the size so as to easily watch the characters.

(Display Position Changing Instruction)

When the display position changing instruction Is detected, the picture text control unit 104 changes the display reference position of text display setting information on the basis of information indicative of the changed display position (Step S229). Thus, the display mode of regarding pre-read or checking of the text as important can be provided thereby.

(Scroll Method Changing Instruction)

When the scroll method changing instruction is detected, the picture text control unit 104 changes the scroll method of text display setting information on the basis of information indicative of the scroll method after the change (Step S230). The scroll method includes a method for sequentially moving the display, a method for moving the display at a predetermined time interval, and a method for starting the movement of the display after a predetermined time. The scroll can be changed to one which is more easily watched by selecting a desired scroll method therefrom.

(Target Text Changing Instruction)

When the target text changing instruction is detected, the picture text control unit 104 changes the target text section to the designated text section (Step S231).

(Text Retrieval Instruction)

When the text retrieval instruction is detected, the picture text control unit 104 performs the keyword retrieval inside text information stored in the picture text storage unit 101 using the keyword inputted together with the text retrieval instruction (Step S232), and acquires the text position and the picture position corresponding to the keyword. The picture text control unit 104 scroll-displays the text by the text display unit 107 with the acquired text position as a starting position, and reproduction-displays the picture by the picture display unit 106 with the acquired picture position as a starting point.

(Picture Display Instruction)

When the picture display instruction is detected, the picture text control unit 104 displays the still frame of the picture corresponding to picture display position information on the picture display unit 106 (Step S233). At the same time, the picture text control unit 104 displays the display text on the text display unit 107 on the basis of picture text corresponding information, text information, and text display setting information stored in the text display setting memory 103. The method for preparing the display text will be described below.

Preparation of Display Text

Figure 7:
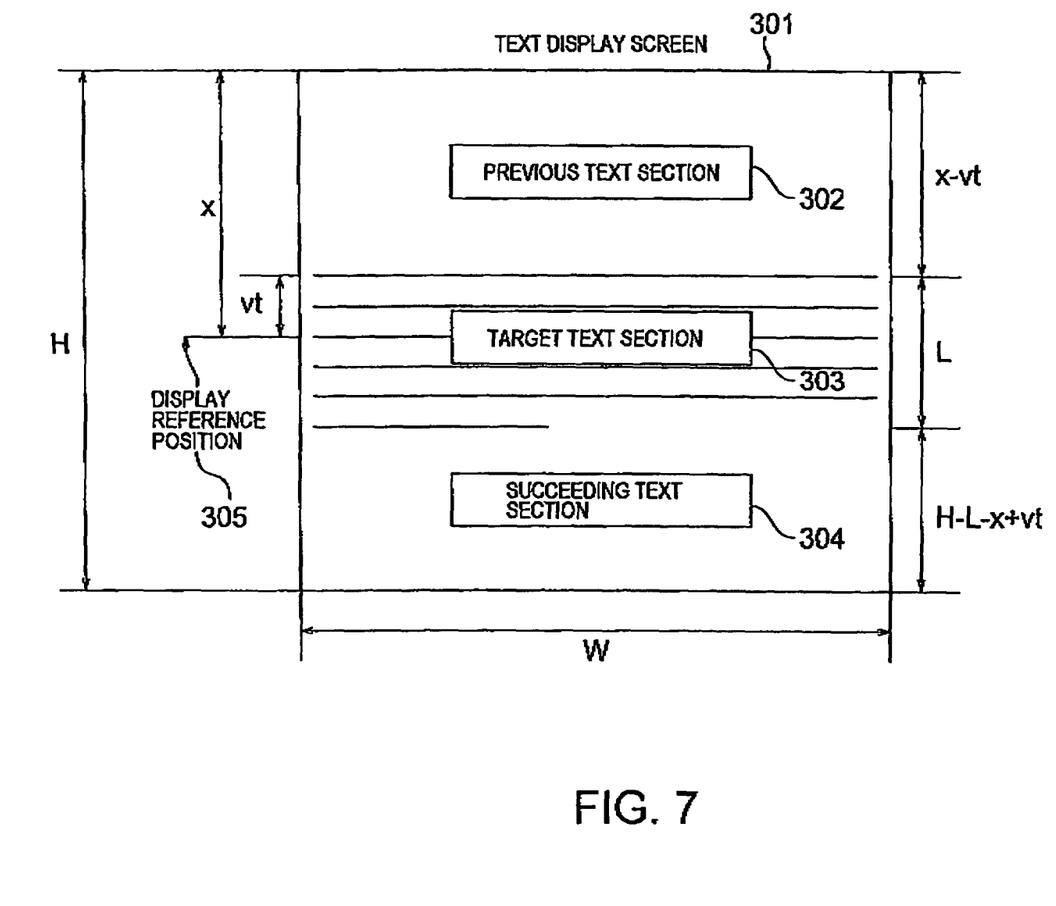
FIG. 7 is a view showing an example of the text display screen according to the present embodiment.

FIG. 7 is a view showing an example of the text display screen according to the present embodiment. An example is given for a case in which a horizontally written text is upwardly scrolled. However, the scrolling direction and the text display direction are not limited thereto.

As shown in FIG. 7, the text display screen 301 with the height H and the width W consists of a display area 302 of the previous text section, a display area 303 of the target text section which is the text section corresponding to the picture presently under reproduction, and a display area 304 of the succeeding text section thereto. The target text section is the text section to satisfy inequalities tn<t<tn+1, where t is the time at the present picture reproduction position, and tn is the starting time of an n-th text section.

Hereafter, L represents the height of the display area 303 of the target text section, x represents the distance between the display reference position 305 corresponding to the center position of the area 303 of the target text section and an upper side of the text display screen 301, t represents the picture reproduction position with the starting time of the target text section as a reference, and v represents the scroll speed.

In this case, the text belonging to the target text section is displayed in the area 303 between the position x−vt and the position L+x−vt from the upper side of the text display screen 301. Further, the text corresponding to the height x−vt out of the text belonging to the previous text section is displayed in the area 302 to the position of x−vt from the upper side of the text display screen 301. The text corresponding to the height of H−L−x+vt out of the text corresponding to the text belonging to the succeeding text section is displayed on the area 304 lower than the position of L+x−vt from the upper side of the text display screen 301. Thus, the display text can be designed and prepared.

By considering the size of the characters, the height L of the target text section can be obtained by the following formula, and the display text can be prepared similarly.

$$L = \left\lceil \frac{nwh}{W} \right\rceil \quad (1)$$

Where, h represents the height of the character, w represents the width of the character, n represents the number of the characters in the text belonging to the target text section, ⌈a⌉ is a ceil function which represents a "minimum integer equal to or greater than a".

Further, the text belonging to the target text section may be highlight displayed (by changing the color or the like). Therefore, the text belonging to the target text section and the position thereof can be displayed in an easily understandable manner.

Further, the text belonging to the target text section may be displayed larger than the text belonging to the other text section. Thus, the text belonging to the text section corresponding to the present picture and the position thereof can be displayed in an easily understandable manner.

Alternatively, the text displayed at the display reference position 305 may be displayed large, and the text may be displayed smaller as the distance from the display reference position is increased. Thus, the text corresponding to the present picture can be displayed in an easily understandable manner, and a temporal difference between the text corresponding to the present picture and the other text can be indicated.

Display Reference Position

The display reference position 305 is set at the center position of the text display screen 301. By setting in this manner, the texts of the preceding and succeeding text sections with respect to the target text section are respectively displayed above and below the center area 303. Thus, the preceding text can be checked only by watching the text display screen 301, and the succeeding text can be pre-read.

Alternatively, the display reference position 305 may be set at the position above the center of the text display screen 301. In this condition, many texts succeeding the target text section can be displayed, and priority can be placed in pre-reading the succeeding text. In particular, it is effective during the 1/N-time slow reproduction.

On the contrary, the display reference position 305 may be set at the position below the center of the text display screen 301. In this condition, many preceding texts of the target text section can be displayed, and priority can be placed on checking the preceding text. In particular, it is effective during the N-time reproduction.

Further, the display reference position 305 can be set at an arbitrary position of the text display screen 301. Thus, the text belonging to the target text section can be displayed at the desired position of the user.

In any case, by setting the display reference position 305, the text of the target text section can be displayed constantly at a predetermined position, The text scroll speed in this condition is calculated as described below.

Scroll Speed Calculation

Now, the scroll calculation method to be executed by the scroll speed calculation unit 102 will be described in detail. Hereafter, n represents the number of characters (the text quantity) in the text belonging to the target text section, T represents the time length of the target picture section corresponding to the target text section, W represents the width of the display area of the text, L represents the height (length) of the text belonging to the target text section, h represents the height of one character, and v represents the scroll speed.

Firstly, the scroll speed v during the sequential scroll is obtained by the formula (2).

$$v = \frac{L}{T} = \frac{\left\lceil \frac{nwh}{W} \right\rceil}{T} \quad (2)$$

As described above, by sequentially determining the scroll speed v, smooth scroll can be performed so that each line of the target text section passes through the area 303 of the height L in the time length T.

The scroll speed v when performing the scroll at a predetermined time interval Td will be obtained by the following formula (3).

$$v = \begin{cases} 0 & (t \bmod T_d \neq 0) \\ \frac{LT_d}{T} = \frac{\left\lceil \frac{nwh}{W} \right\rceil T_d}{T} & (t \bmod T_d = 0) \end{cases} \quad (3)$$

Where, a mod b represents the remainder when a is divided by b. As described above, when performing the scroll at a predetermined time interval, the processing quantity required to prepare the display text can be reduced.

Further, as a scroll method, the scroll can be set to start after a lapse of a predetermined time (Tq) from the starting time of the target text. The scroll speed v in this condition can be obtained by the following formula (4).

$$v = \begin{cases} 0 & (t \leq T_q) \\ \frac{L}{T - T_q} = \frac{\left\lceil \frac{nwh}{W} \right\rceil}{T - T_q} & (t > T_q) \end{cases} \quad (4)$$

As described above, the text can be easily read by starting the scroll after a lapse of a predetermined time from the starting time of the target text.

In addition, the scroll speed v can be calculated by a small unit if the starting time or the ending time is preliminarily given even by a small unit such as each word, each paragraph and each sentence of the text. Thus, the picture and the text can be synchronously displayed in a much smaller unit time.

For example, a case will be described, in which the time is provided to each work of the text. Firstly, the number of characters to be displayed in each line is obtained from the size of the display area of the text and the size of one character. Subsequently, the leading word and the last word of each line are obtained from the text and the number of characters to be displayed in each line, the starting time of the leading word is set to be the starting time of the line, and the ending time of the last word is set to be the ending time of the line. Subsequently, the scroll speed v of each line is obtained from the display size of one character, the starting time of each line, and the ending time of each line. The scroll speed V can be obtained by using a method similar to that in which the time is provided to the text section. When the reproduction time reaches the ending time of the line, the scroll speed v of the next line is calculated to perform the scroll display. Thus, the scroll speed v can be changed by the line unit.

In addition, by performing the highlight such as the change of the display color of the word when reaching the starting time of the word, the correspondence between the picture and the text can be grasped by the word unit. Further, by calculating the moving speed of the highlight from the starting time and the ending time of the of the word, the number of characters of the word, and the display size of the character, the highlight can be moved smoothly.

It is similar for the case in which the time is given to each paragraph and each sentence of the text. If a plurality of paragraphs and sentences are included in one line, the scroll speed can be obtained by a similar processing to that of the above-described case in which the time is given to each word. If one paragraph and one sentence are displayed by a plurality of lines, the scroll speed can be obtained by the similar processing to that of the above-described case in which the time is given to the text section.

Further, the scroll speed may be changed according to readability of the text. For example, the scroll speed v may be calculated so that the scroll speed v is decreased/increased when the total stroke count of the characters to constitute the text is increased. Needless to say, the scroll speed may be changed according to the input from the user.

For example, a case will be described, in which the scroll speed v is obtained by using the character stroke count. The scroll speed calculation unit 102 maintains a character stroke count dictionary for storing the character stroke count. When the scroll speed v of the target line is obtained, the scroll speed calculation unit 102 firstly obtains the stroke count corresponding to the character by referring to the character stroke count dictionary for the character which constitutes each line in the target text section, and obtains the total stroke count of the characters which constitutes each line. The scroll speed calculation unit 102 obtains the scroll speed v of the target line by performing the proportional distribution of the reproduction time according to the total stroke count of the line from the starting time and the ending time of the target text section and the total stroke count of the characters which constitutes each line. Thus, the scroll speed v can be changed according to readability.

As described above, by changing the scroll speed v of the text according to the quantity of the text and the time corresponding to the picture, the text corresponding to the picture can be displayed at the constantly same position, and the change of the display setting can be flexibly coped with. In addition, by displaying the preceding and succeeding texts with respect to the text corresponding to the picture, the text can be read back or pre-read to facilitate the understanding.

Further, the picture-ready text display control device according to the present embodiment can realize the above-described picture text control and scroll speed calculation program by the software on the program control processor.

Second Embodiment

The present invention is also applicable to a network system for distributing picture text contents from a server to a terminal.

Figure 8:
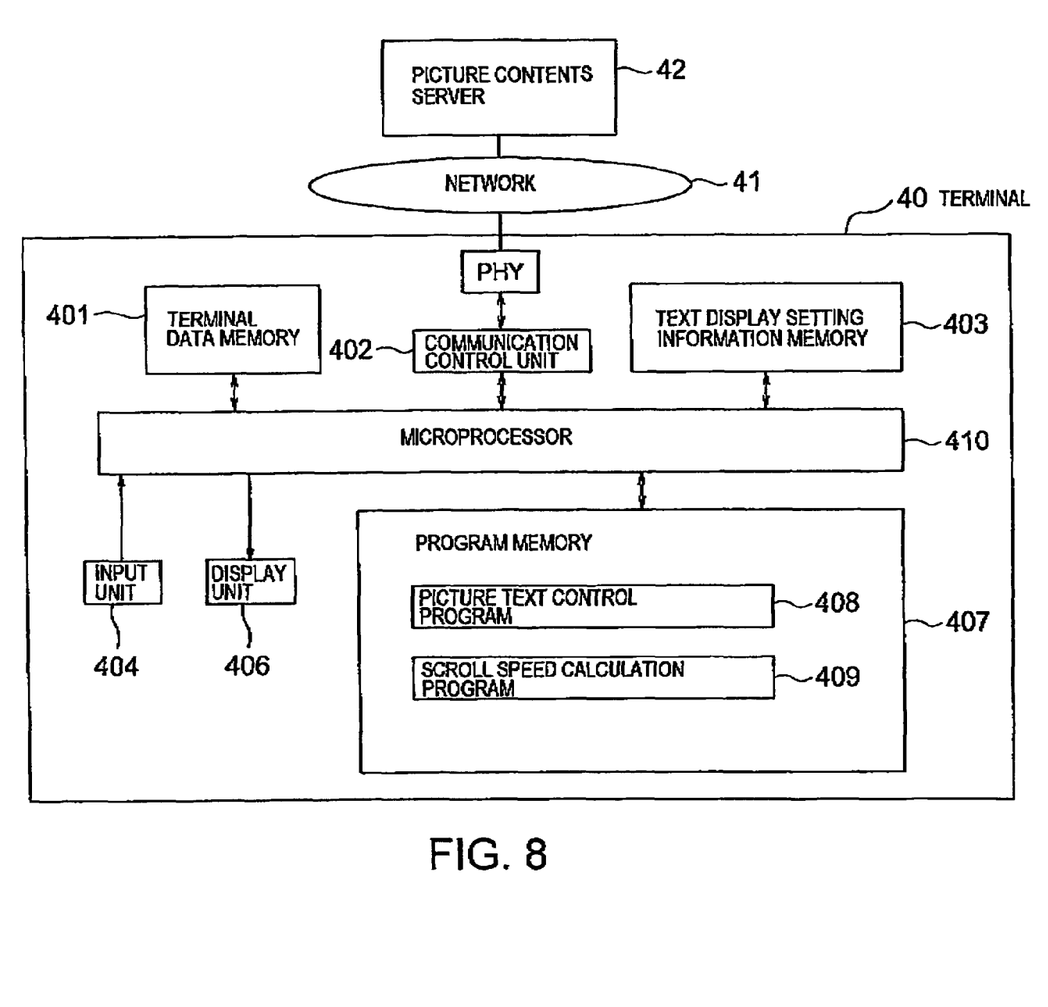
FIG. 8 is a block diagram showing a schematic configuration of the picture-ready text display system according to a second embodiment of the present invention.

FIG. 8 is a block diagram to show the schematic configuration of a picture-ready text display system according to a second embodiment of the present invention. In FIG. 8, a terminal 40 is a computer having the communication function used in households and offices in a fixed manner, or a portable information terminal. The terminal 40 is accessible to the server 2 through a network 41.

The terminal 40 comprises a terminal data memory 401 for storing the data to specify the terminal such as the ID number, the area code of the installed terminal. In a case of the portable information terminal, a identifier of an access point connected to the network may be used for the area code.

The terminal 40 further comprises a communication control unit 402 connected to the network to perform the data communication, a text display setting information memory 403 for storing the above-described text display setting information, an input unit 404 including a numeric keypad capable of inputting various kinds of user instructions, a display unit 406 for displaying the picture and the text, and a program memory 407 for storing necessary programs. The program memory 407 includes a picture text control program 408 and a scroll speed calculation program 409. A microprocessor 410 executes these programs to perform the above-described picture-ready test display.

As described above, according to the present invention, the scroll speed v of the text is changed according to the quantity of the text and the time length corresponding to the picture, the text corresponding to the picture is displayed constantly at the same position to easily understand the text. In this condition, the scroll speed v of the text is changed by the contents of the picture, and information deeply related to the user and information desired by the user can be displayed selectively.

For example, the area code is preliminarily given to each text section in the picture text contents of, for example, a server 42. When the user requests a specified picture to the server 42 by using the terminal 40, the server 42 transmits the picture and the text data corresponding thereto to the terminal 40 through the network 41.

The picture and the text received by the terminal 40 are displayed on the display unit 406 as described above. In the condition, the area code stored in the terminal data memory 401 is compared with the area code of each received text section. When they are agreed with each other, by decreasing the scroll speed v, the text of the text section can be set so that the text can be slowly scroll-displayed as the target text section. Thus, information related to the place or the area in which the user is presently present can be readably displayed.

The method for reproduction display with the picture in synchronism with the text is described above. However, the present invention is not only limited to the picture, but applicable to series information such as sound. For example, the scroll display of the text can be performed by using sound information in place of the picture while being synchronous with the sound reproduction. Also in this case, the above-described effect can be obtained.

As described above in detail, according to the present invention, the text corresponding to series information can be reliably displayed at the easily watchable position by adequately changing the scroll speed v according to the quantity of the text and the time length, it results in easily understanding series information and text information TI.

Further, by also displaying continuous preceding and succeeding texts, the text can be read back, the text can be pre-read, and the text can be understood more easily.

The invention claimed is:

1. A scroll display control device including a non--transitory computer readable medium which stores a program for causing a computer to execute scroll-displaying, in synchronism with reproduction of series information correlated to text information, the corresponding text information on a text display screen, said scroll display control device comprising:
means which changes a scroll speed of a target text in said text display screen on the basis of a text quantity of said corresponding text information with respect to reproduction time of said series information,
wherein a display area of the target text is fixed at a display reference position of the text display screen,
a scroll speed calculation means which calculates said scroll speed of the target text on the basis of a time length of a series information section being reproduced, a quantity of the target text belonging to a target text section corresponding to said series information section, and text display setting information;
a user instruction input means for dynamically changing the text display setting information related to the display reference position of the text display screen and the scroll method comprising a method for starting a scroll after a lapse of a predetermined time from a starting time of the target text, wherein text of a preceding text section which preceded the target text section and text of a succeeding text section which succeeds the target text section are respectively displayed in two adjacent areas across the target text section displayed at the display reference position of the text display screen,
wherein the scroll speed calculation means calculates said scroll speed of the target text on the basis of the display reference position changed by the user instruction input means.

2. The scroll display control device according to claim 1, wherein a reproduction time is a time length of said series information.

3. The scroll display control device according to claim 1, wherein said scroll speed is increased in response to the text quantity increasing with respect to said reproduction time and said scroll speed is decreased in response to the text quantity decreasing with respect to said reproduction time.

4. The scroll display control device according to claim 1, wherein the series information is image information or sound information.

5. The scroll display control device according to claim 1, wherein the text quantity of said corresponding text information is an amount of the target text corresponding to the series information per unit time.

6. The scroll display control device according to claim 1, wherein the text quantity of said corresponding text information is a total number of characters included within said corresponding text information.

7. A scroll display control device including a non-transitory computer readable medium which stores a program for causing a computer to execute scroll-displaying, in synchronism with reproduction of series information correlated to text information, the corresponding text information on a text display screen, said scroll display control device comprising:
scroll speed calculation means which calculates a scroll speed of a target text on the basis of at least a time length of a series information section presently under reproduction and a quantity of the target text belonging to a target text section corresponding to the series information section during reproduction and text display setting information;
control means which scroll-displays the target text belonging to the target text section at a display reference position of said text display screen according to said scroll speed; and
a user instruction input means for dynamically changing the text display setting information related to the display reference position of the text display screen and the scroll method comprising a method for starting a scroll after a lapse of a predetermined time from a starting time of the target text, wherein text of a preceding text section which precedes the target text section and text of a succeeding text section which succeeds the target text section are respectively displayed in two adjacent areas across the target text section displayed at the display reference position of the text display screen,
wherein the scroll speed calculation means calculates said scroll speed of the target text on the basis of the display reference position changed by the user instruction input means.

8. The scroll display control device according to claim 7, further comprising a text display setting information memory which variably stores the text display setting information of the text displayed on said text display screen.

9. The scroll display control device according to claim 8, wherein said text display setting information memory variably stores a plurality of scroll methods and said control means scroll-displays the text according to the selected scroll method.

10. The scroll display control device according to claim 8, wherein said text display setting information memory variably stores the display reference position of said text display screen.

11. The scroll display control device according to claim 7, further comprising a storage means which searchably stores the series information and the text information.

12. The scroll display control device according to claim 7, wherein the series information and the text information corresponding thereto is acquired by accessing a server which provides the series information and the text information.

13. The scroll display control device according to claim 7, the quantity of the target text belonging to the target text section corresponding to the series information section is a total number of characters included within the target text section.

14. The scroll display control device according to claim 7, wherein the target text belonging to the target text section corresponds to a picture section currently under reproduction, the picture section having the time length comprising a predetermined set of frames selected from a plurality of frames which make up the series information.

15. The scroll display control device according to claim 7, wherein text information is divided into a plurality of text sections, each of the plurality of text sections corresponding to at least one of a different speaker and different sentence, and
the series information is divided into a plurality of picture sections each having a corresponding time length, each time length having at least one of (1) a duration indicated by a starting time and ending time and (2) a set of frames.

16. The scroll display control device according to claim 15, wherein the plurality of text sections include the target text section, the preceding text section, and the succeeding text section, and
the text of the preceding text section and the text of the succeeding text section are respectively displayed simultaneously along with the target text section in two adjacent areas across the target text section which is displayed at the display reference position.

17. The scroll display control device according to claim 7, wherein in response to there being a section that any text is not presented between the target text section and the preceding or succeeding text section, the target text section includes the section in question.

18. A scroll display control method comprising:
displaying text information corresponding to sound in a scroll manner, such that the text information is displayed in synchronism with reproduction of sound information by changing a scroll speed of a target text adaptable to the sound during reproduction,
wherein a display area of said text information is fixed at a display reference position of a text display screen,
a scroll speed calculation means which calculates said scroll speed of the target text on the basis of a time length of a sound information section being reproduced, a quantity of the target text belonging to a target text section corresponding to said sound information section, and text display setting information; and
a user instruction input means for dynamically changing the text display setting information related to the display reference position of the text display screen and the scroll method comprising a method for starting a scroll after a lapse of a predetermined time from a starting time of the target text, wherein text of a preceding text section which precedes the target text section and text of a succeeding text section which succeeds the target text section are respectively displayed in two adjacent areas across the target text section displayed at the display reference position of the text display screen,
wherein the scroll speed calculation means calculates said scroll speed of the target text on the basis of the display reference position changed by the user instruction input means.

19. A scroll display control method comprising:
displaying and reading text information corresponding to a picture in synchronism with reproduction of the picture in a scrolling manner, and performing scroll display of said text information in synchronism with the reproduction of the picture information by changing a scroll speed of a target text adaptable to the picture under reproduction,
wherein a display area of said text information is fixed at a display reference position of a text display screen,
a scroll speed calculation means which calculates said scroll speed of the target text on the basis of a time length of a picture information section being reproduced, a quantity of the target text belonging to a target text section corresponding to said picture information section, and text display setting information; and
a user instruction input means for dynamically changing the text display setting information related to the display reference position of the text display screen and the scroll method comprising a method for starting a scroll after a lapse of a predetermined time from a starting time of the target text, wherein text of a preceding text section which precedes the target text section and text of a succeeding text section which succeeds the target text section are respectively displayed in two adjacent areas across the text section displayed at the display reference position of the text display screen, wherein changing a text display setting of the text to be synchronously displayed with reproduction of the picture, and wherein, when the text display setting of the target text is changed, said scroll speed is derived on the basis of the changed text display setting of the target text,
wherein the scroll speed calculation means calculates said scroll speed of the target text on the basis of the display reference position changed by the user instruction input means.

20. The scroll display control method according to claim 19, wherein the text information to be displayed is text information belonging to a text section corresponding to the picture during reproduction and to preceding and succeeding text sections thereof.

21. The scroll display control method according to claim 19, wherein when the target text section corresponding to a picture reproduction position is changed, said scroll speed is derived on the basis of a time length of a picture section corresponding to the picture reproduction position and a text quantity of the target text section corresponding to the picture reproduction position.

22. The scroll display control method according to claim 19, wherein reproduction of the picture is one of still picture reproduction, n-time reproduction, n-time rewind reproduction, and slow reproduction, where n is an integer equal to or greater than 1.

23. The scroll display control method according to claim 22, wherein a number of characters displayed in the target text section is increased by automatically changing the text display setting when reproduction of the picture is either fast-forward reproduction of at least two-time fast-forward reproduction or rewind reproduction.

24. The scroll display control method according to claim 23, wherein the changing of the text display setting includes at least one of changing the display reference position of the target text, changing of a text display area size indicative of a height and a width of a text display area, and changing of a display text character size indicative of a height and a width of a text character.

25. The scroll display control method according to claim 22, wherein a number of characters displayed in a text section succeeding the target text section corresponding to the picture under reproduction is increased by automatically changing the text display setting when reproduction of the picture is slow reproduction.

26. The scroll display control method according to claim 25, wherein the changing of the text display setting includes at least one of changing the display reference position of the target text, changing of a text display area size indicative of a height and a width of a text display area, and changing of a display text character size indicative of a height and a width of a text character.

27. The scroll display control method according to claim 19, wherein the changing of the text display setting includes at least one of changing the display reference position of the target text, changing of a text display area size indicative of a height and a width of a text display area, and changing of a display text character size indicative of a height and a width of a text character.

28. The scroll display control method according to claim 19, wherein in response to there being a section that any text is not presented between the target text section and the preceding or succeeding text section, the target text section includes the section in question.

29. A computer system for scroll-displaying text information in synchronism with reproduction of picture information correlated to the text information, said computer system comprising:
    display means which provides a picture display screen which displays picture information and a text display screen which displays text information corresponding to the picture information;
    a program control processor which controls display by said display means of the picture information and the text information;
    a non-transitory computer readable medium which stores a program executed by a computer on said program control processor, and
    said program comprising:
    calculating a scroll speed of a target text on the text display screen on the basis of at least a time length of a picture section presently under reproduction, a quantity of the target text belonging to a target text section corresponding to the picture section, and text display setting information;
    scroll-displaying the target text belonging to the target text section at a display reference position of the text display screen of said text display screen according to the scroll speed; and
    dynamically changing, by a user instruction input means, the text display setting information related to the display reference position and the scroll method comprising a method for starting a scroll after a lapse of a predetermined time from a starting time of the target text, wherein text of a preceding text section which precedes the text section and text of a succeeding text section which succeeds the target text section are respectively displayed in two adjacent areas across the target text section displayed at the display reference portion of the text display screen,
    wherein said calculating calculates said scroll speed of the target text on the basis of the display reference position changed by said user instruction input means.

30. A non-transitory computer-readable medium storing a program for causing a computer to realize series information-ready text display, for scroll-displaying text information on a text display screen in synchronism with reproduction of series information correlated to the text information, said computer program comprising:
    calculating a scroll speed of a target text on the basis of at least a time length of a series information section presently under reproduction, a quantity of the target text belonging to a target text section corresponding to the series information section during reproduction, and text display setting information;
    scroll-displaying the target text belonging to the target text section at a display reference position of the text display screen according to the scroll speed; and
    a user instruction input means for dynamically changing the text display setting information related to the display reference position of the text display screen and the scroll method comprising a method for starting a scroll after a lapse of a predetermined time from a starting time of the target text, wherein text of a preceding text section which precedes the target text section and text of a succeeding text section which succeeds the target text section are respectively displayed in two adjacent areas across the target text section displayed at the display reference position of the text display screen,
    wherein said calculating calculates said scroll speed of the target text on the basis of the display reference position changed by the user instruction input means.

31. The non-transitory computer-readable medium according to claim 30, wherein in response to there being a section that any text is not presented between the target text section and the preceding or succeeding text section, the target text section includes the section in question.

* * * * *